Oct. 1, 1935.  E. G. BRIDGES  2,015,662
GLASSWARE FORMING MACHINE
Filed Nov. 21, 1929  9 Sheets-Sheet 2
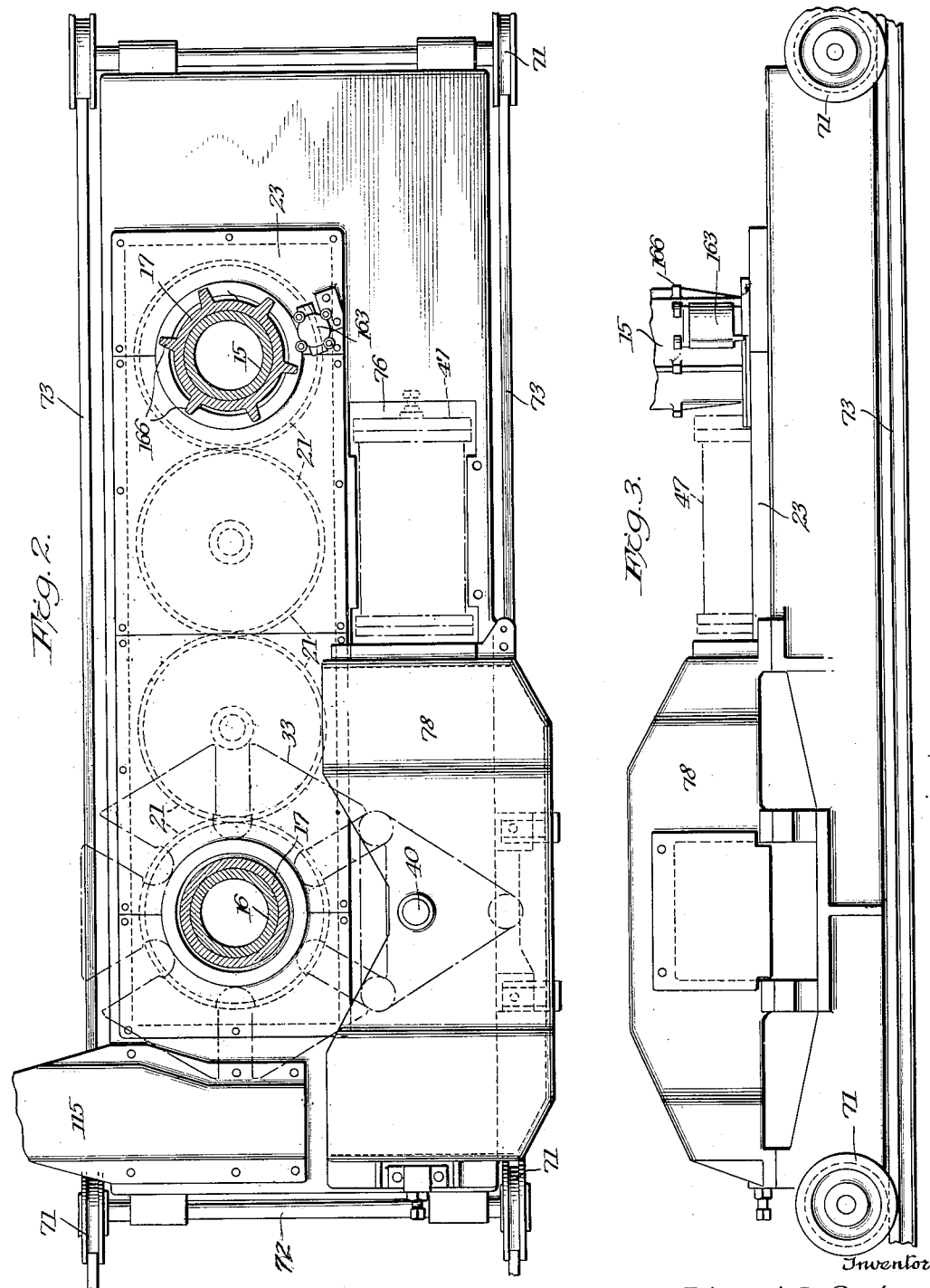
Inventor
Edward G. Bridges
By Emery, Booth, Varney & Holcombe
his Attorneys

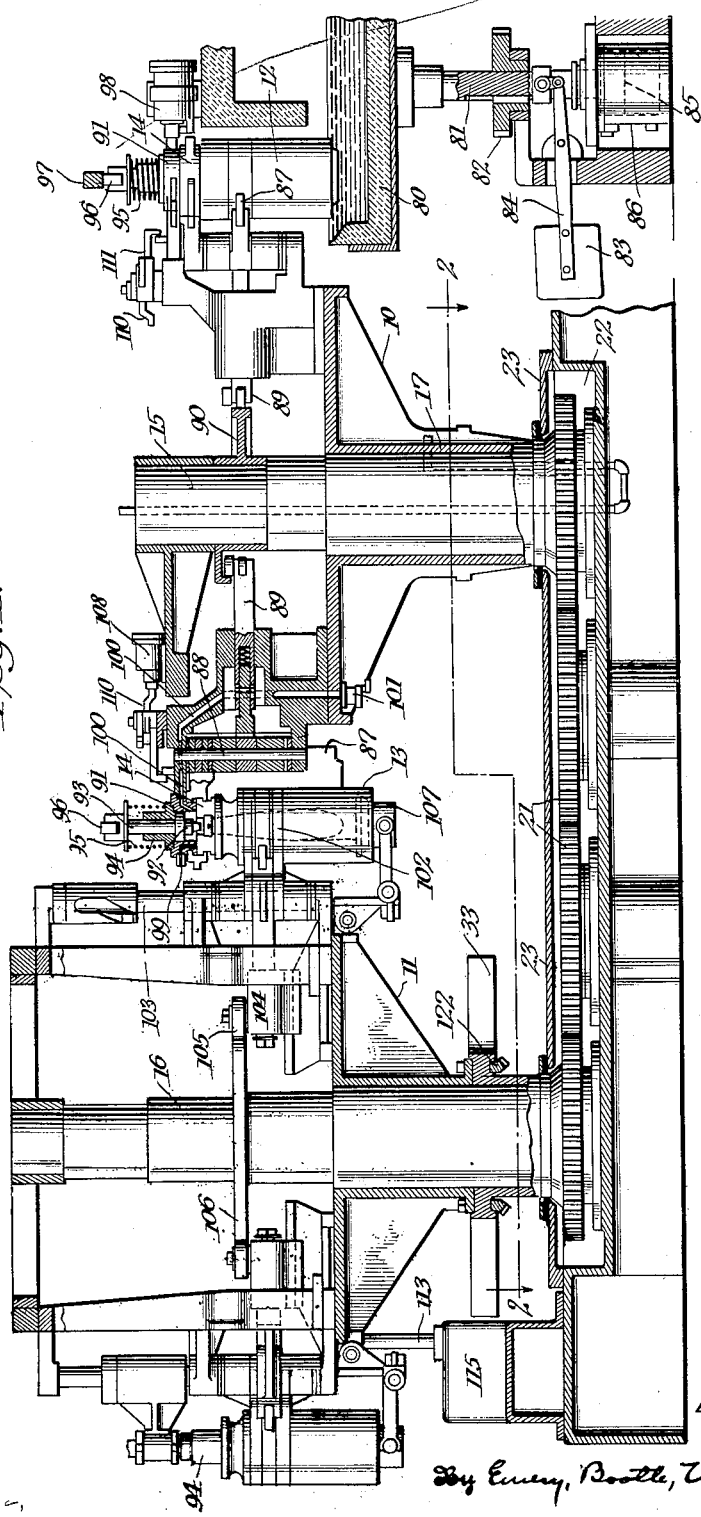

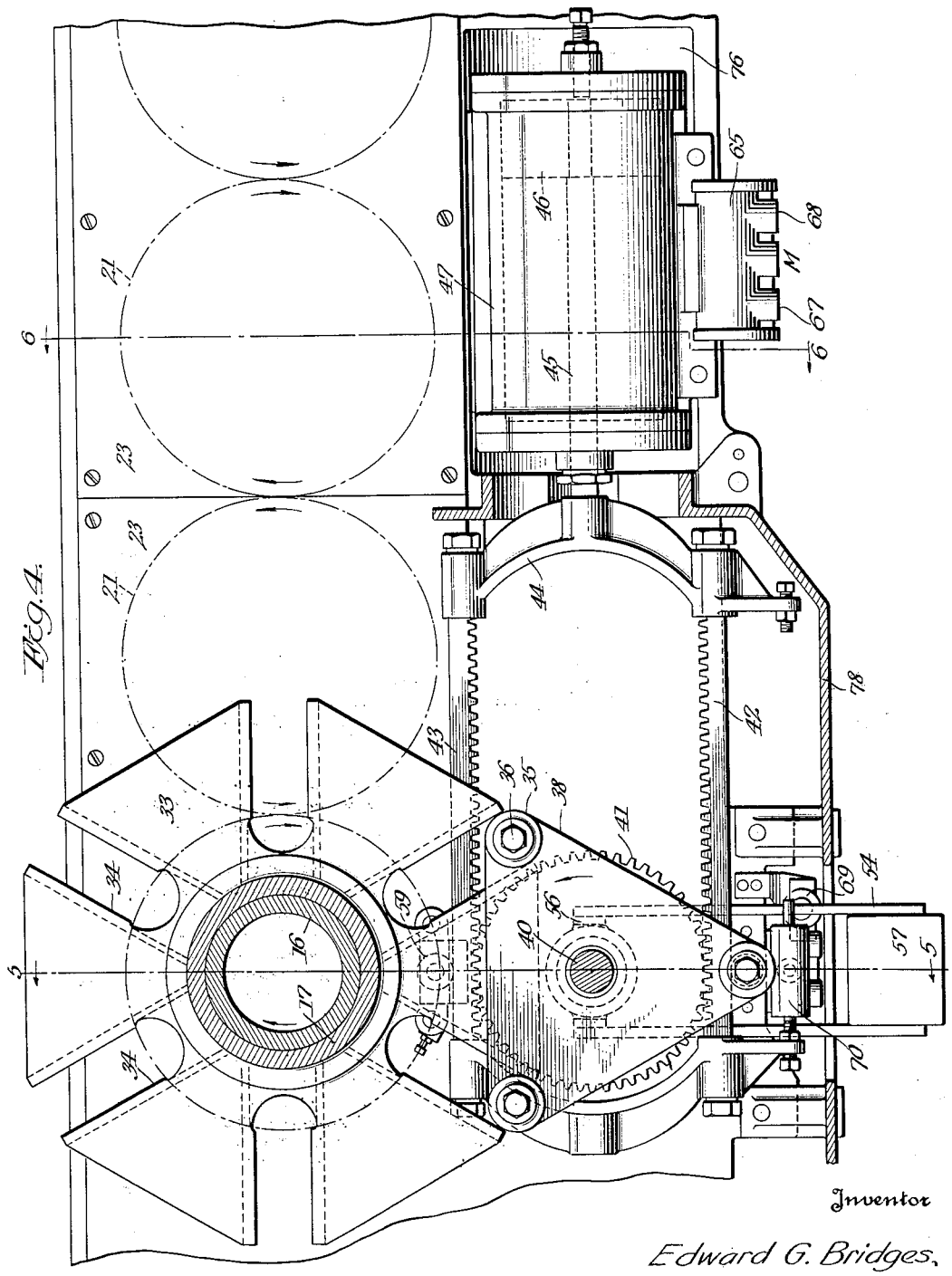

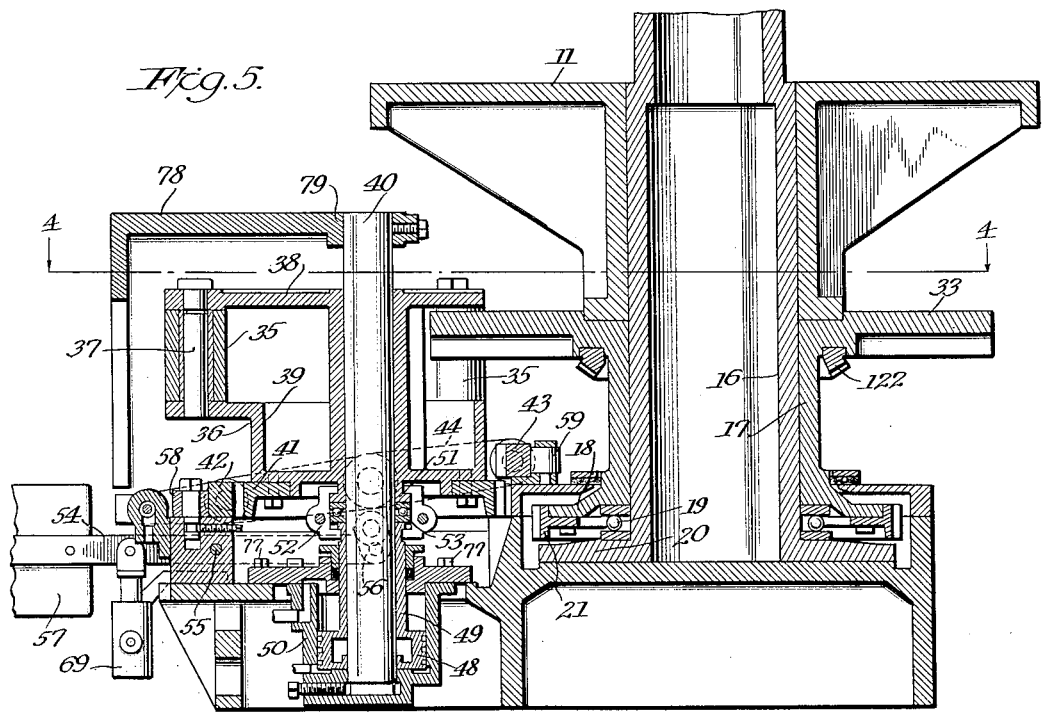

Oct. 1, 1935.  E. G. BRIDGES  2,015,662
GLASSWARE FORMING MACHINE
Filed Nov. 21, 1929   9 Sheets-Sheet 6
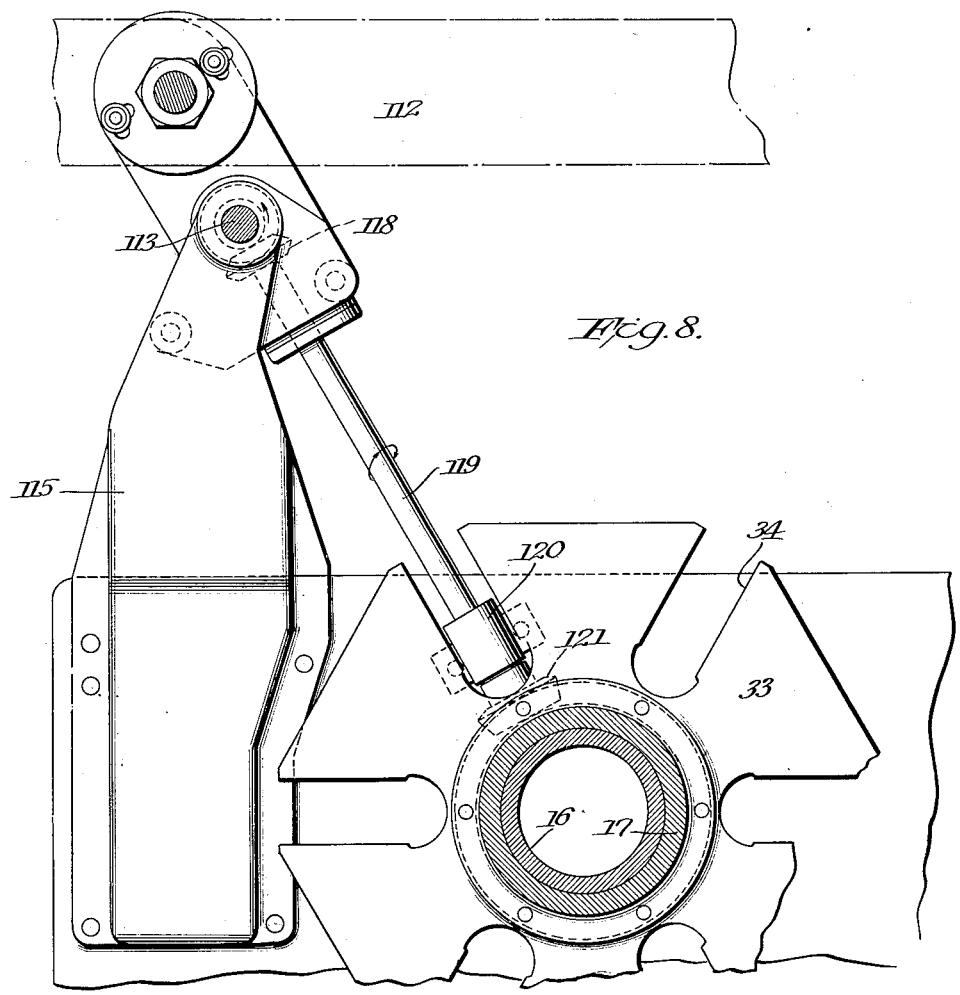
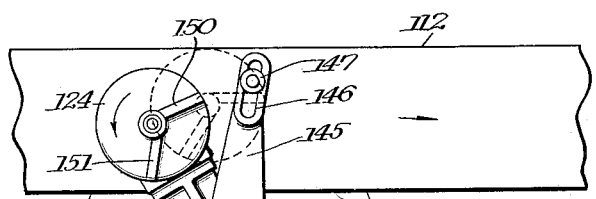
Inventor
Edward G. Bridges
By Emery, Booth, Varney & Holcombe
his Attorneys

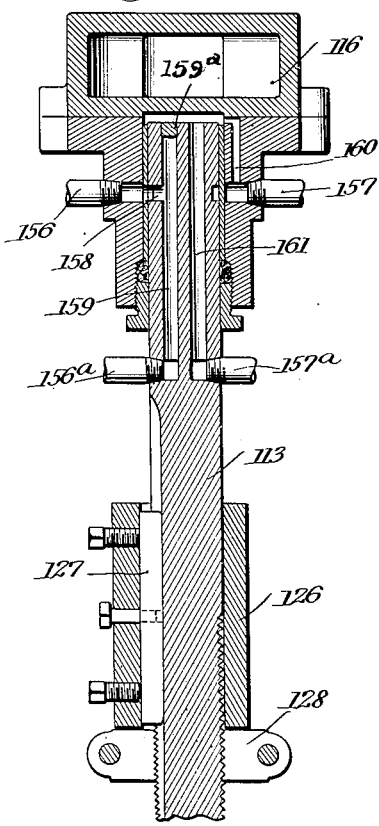
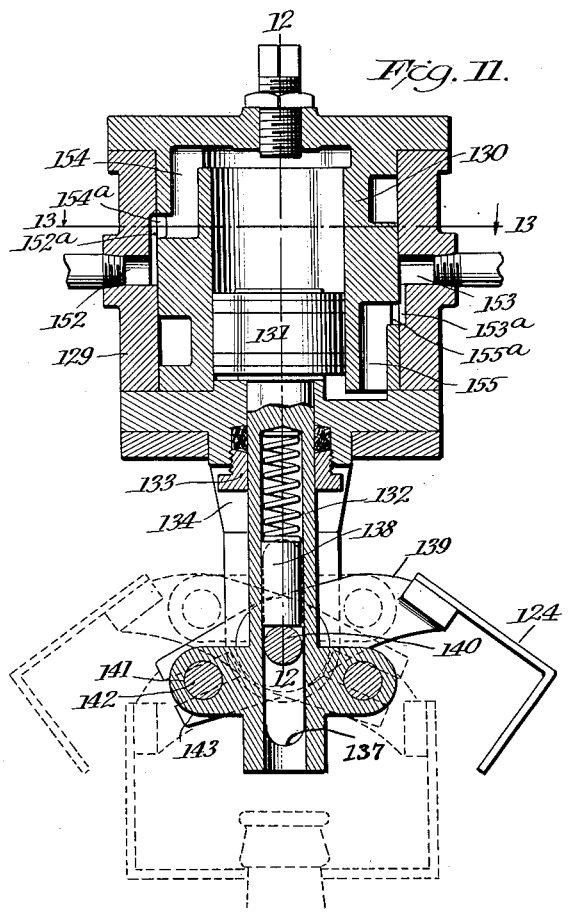
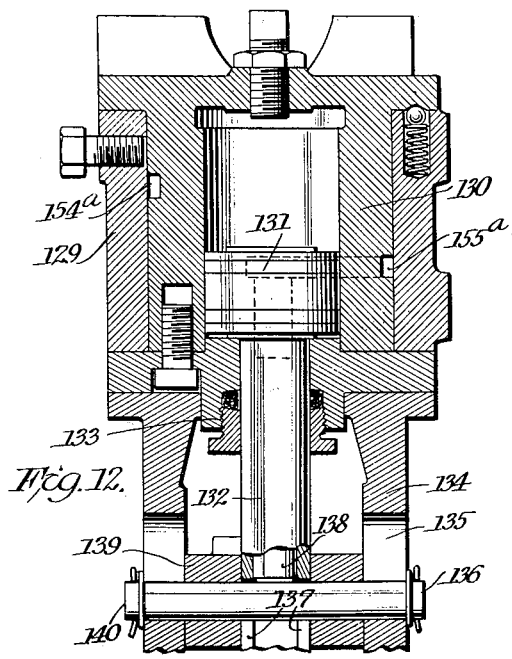
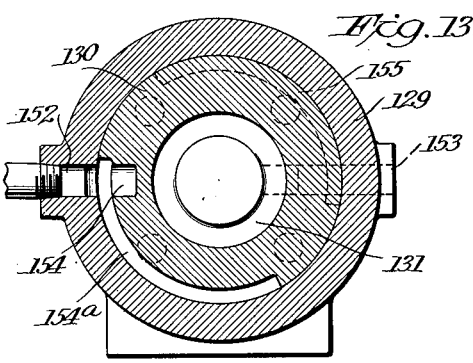

Oct. 1, 1935.  E. G. BRIDGES  2,015,662
GLASSWARE FORMING MACHINE
Filed Nov. 21, 1929  9 Sheets-Sheet 8
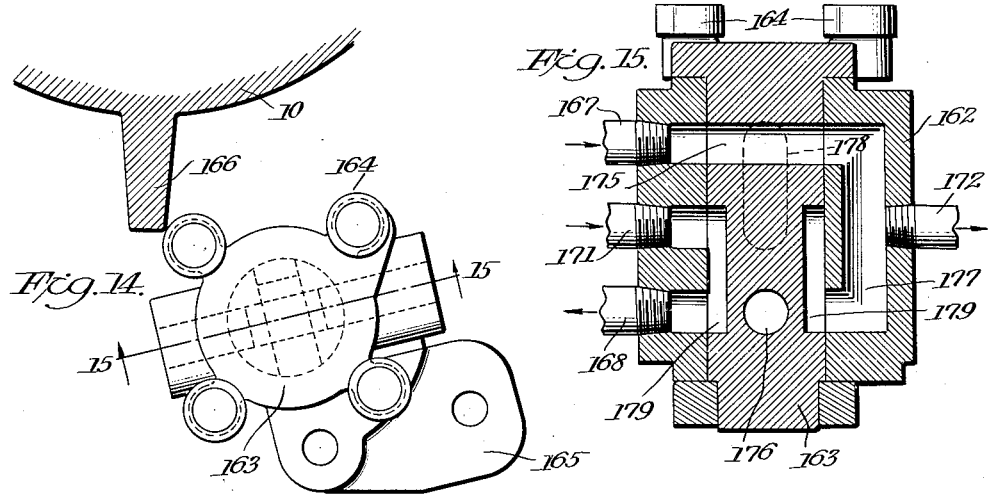
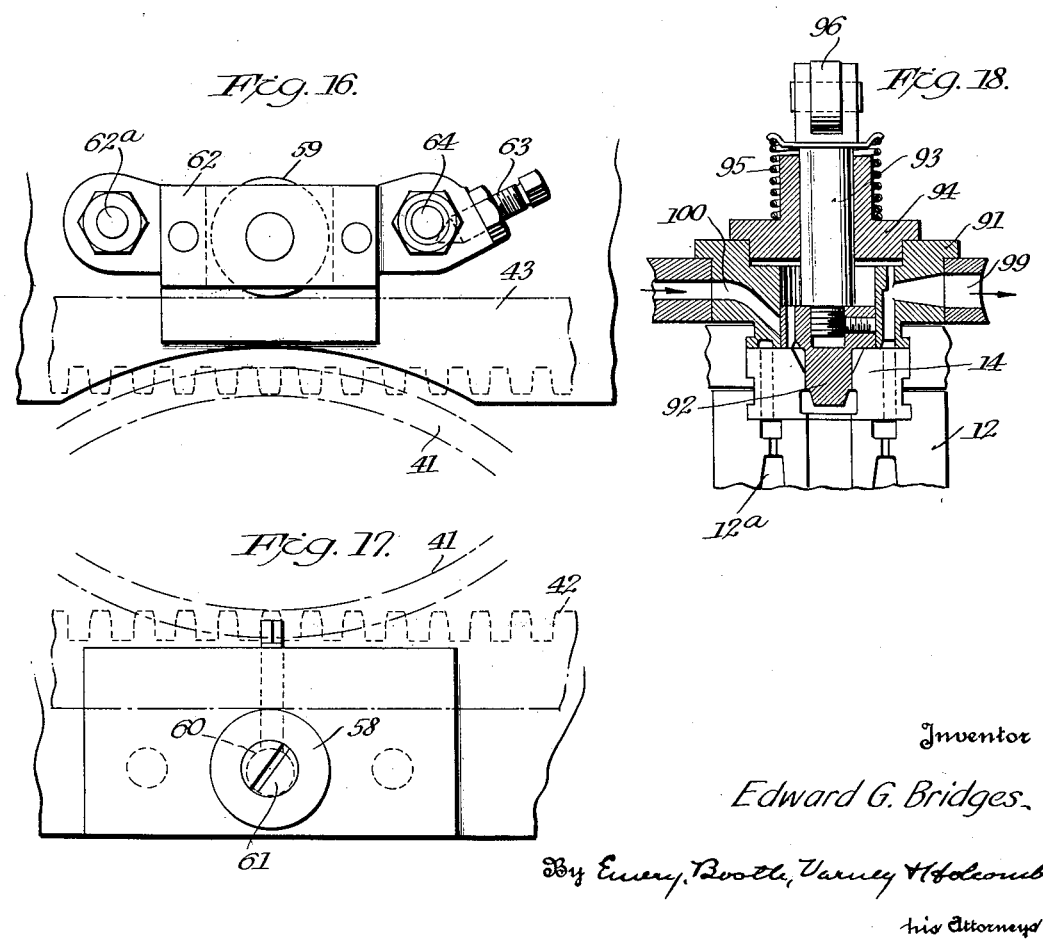
Inventor
Edward G. Bridges

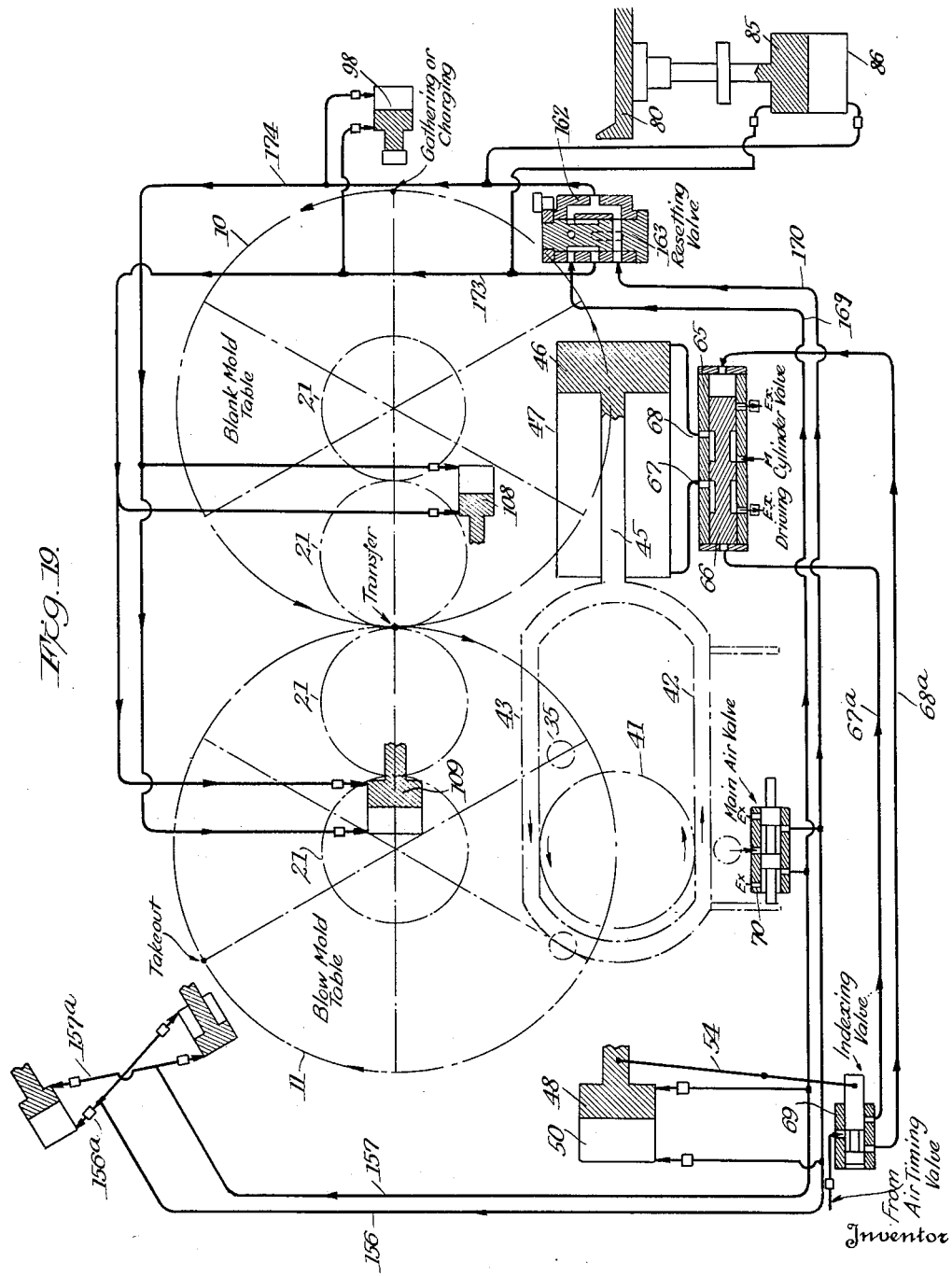

UNITED STATES PATENT OFFICE 2,015,662

GLASSWARE FORMING MACHINE

Edward G. Bridges, Anderson, Ind., assignor to Lynch Corporation, a corporation of Indiana Application November 21, 1929, Serial No. 408,890

16 Claims. (Cl. 49—5)

The present invention relates to glassware forming machines, particularly those for the manufacture of hollow glass containers, and aims generally to improve the construction and operation of such machines, both to better the quality and increase the quantity of ware produced, and to reduce the trouble and expense of maintaining the machines in good working conditions.

In the art of forming glassware, particularly for forming hollow glass containers by blowing, or by pressing and blowing, it is desirable to provide a series of molds mounted for rotation upon single or individual carriers, so that the molds may be moved to or through successive stations or regions for their proper successive functioning and the desired manipulation upon the glass charges therein at successive forming stages.

In existing machines of the intermittently rotating type, the molds are moved to successive stations where they are brought to rest for the fabrication of the glass therein. This necessitates a comparatively long bottle forming time with consequent relatively low per-hour output of each machine. Machines of the so-called continuous rotary type have been proposed to overcome these deficiencies, by effecting fabrication of the glass during movement of the molds, but such machines are subject to derangement, breakage and enforced idleness due to the unyielding and inflexible drive heretofore used and the consequent damage to the machine when it becomes jammed.

My invention aims to improve glassware forming machines generally, and particularly those of the type wherein the fabrication of the glass is effected during movement of the molds, so that my new machine is capable of the maximum output of the continuous machines of corresponding size, but also possesses the yielding and flexible drive of the machines of the intermittent type.

More specifically, the invention aims to increase the usefulness of existing machines of the rotary type, by improving the mechanism for rotating the mold carriers, and simplifying the construction and automatic controlling devices of the machine.

Although the major features of my present invention are adaptable for use in a variety of different machines, and types, they are advantageously illustrated in one preferred embodiment thereof, exemplified in the accompanying drawings, wherein Fig. 1 is a longitudinal sectional view of the machine;

Fig. 2 is a horizontal sectional view taken on the line 2—2 of Fig. 1 showing the base and housings for the carrier drive in plan;

Fig. 3 is a side elevation of the base and housings shown in Fig. 2;

Fig. 4 is an enlarged horizontal sectional view of the carrier drive mechanism on the line 4—4 of Fig. 5;

Fig. 5 is a transverse sectional view taken on the line 5—5 of Fig. 4;

Fig. 6 is a transverse sectional view taken on the line 6—6 of Fig. 4;

Fig. 8 is a horizontal sectional view taken on the line 8—8 of Fig. 7;

Fig. 9 is a horizontal sectional view taken on the line 9—9 of Fig. 7, illustrating the manner of rotating the take-out gripping device and the ware axially;

Fig. 10 is a detail sectional view taken on the line 10—10 of Fig. 7;

Fig. 11 is a detail sectional view of one of the gripping members of the take-out mechanism taken on the lines 11—11 of Fig. 7;

Fig. 12 is a sectional view thereof taken on the line 12—12 of Fig. 11;

Fig. 13 is a horizontal sectional view taken on the line 13—13 of Fig. 11;

Fig. 14 is a detail plan view of the resetting air control valve;

Fig. 15 is a detail sectional view thereof taken on the line 15—15 of Fig. 14;

Figs. 16 and 17 are detail views of the separate and individual adjustments of the guide rollers for the rack bar;

Fig. 18 is an enlarged detail sectional view of the upper end of the parison mold, the neck mold and holder, and the mouth forming pin and mounting therefor; and Fig. 19 is a diagrammatic view of the timing and automatic control of the machine.

Figure 7:
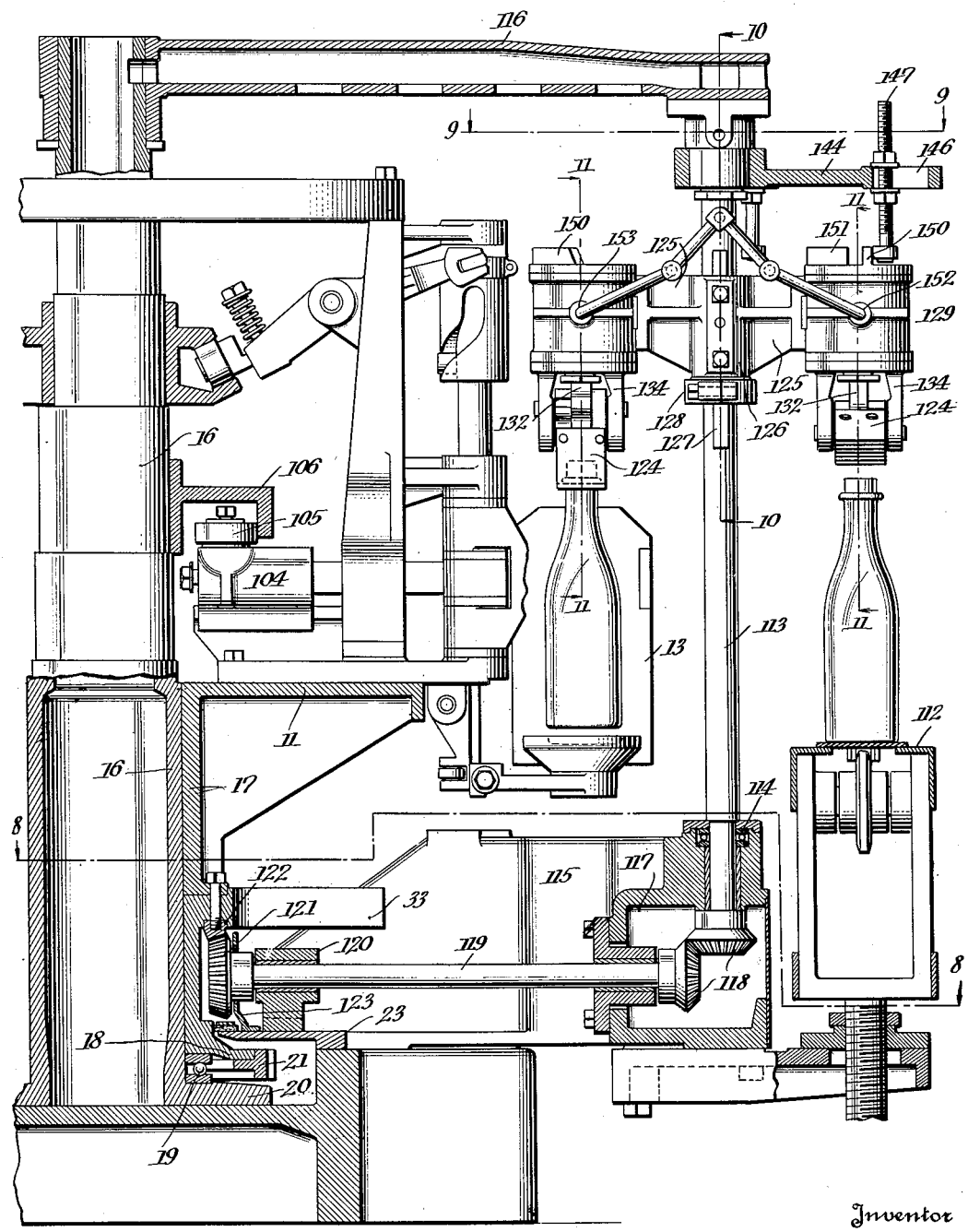
Fig. 7 is a vertical sectional view taken through the take-out mechanism showing its association with the blow mold carrier.

The machine selected for illustration in the accompanying drawings is of the two-table or mold carrier type, adapted for the manufacture of hollow glass containers, such as bottles, jars and the like, with the separate mold carriers arranged side by side, this form being preferable because of the convenience and facility with which a battery of machines may be arranged around the furnace or tank containing the supply of molten glass, although obviously the invention is equally applicable to other types of machines, viz; machines for making articles other than containers, with single or cooperating pairs of molds on a single carrier or upon vertically spaced carriers, as desired, as is well understood in the art.

In the illustrated embodiment the respective mold carriers 10 and 11 are interconnected for movement in unison, as will be more fully described hereinafter, and the carrier 10 has mounted thereon a plurality of blank or parison molds 12, adapted to be presented in succession to a gathering or charging station, where the mold receives its charge of glass from a tank or pot or from a mechanical gob feeding device as is well understood. Successive movements of the mold table 10 move the charged mold 12 toward a transfer station, and mechanism is provided for automatically opening the mold 12, leaving the parison suspended in the cooperating neck ring 14, as the mold approaches transferring station, where a blow mold 13 is closed around the suspended parison, and the neck ring 14 is released therefrom, thus effecting complete transfer of the glass article from one forming mold to another. Preferably the glass in the parison mold 12 is subjected to fabricating operations, such as compacting and counter blowing to properly shape the parison and prepare it for final blowing to its finished form in the finishing mold 13, and this is advantageously done following charging and continuing until the molds open preparatory to transferring.

Following the transfer of the parison to the finishing mold, the parison is permitted to remain in the blow mold 13 sufficiently long to enable it to come to a uniform temperature throughout, known as reheating, which time approximates the time required for the formation of the parison in the parison mold 12. When the redistribution of heat in the parison has been completed, it is subjected to air under pressure, the beginning and duration of which may be controlled as in my copending application Serial No. 386,894, filed August 19, 1929, whereby it is blown to its finished form in the mold 13, and thereafter is permitted to cool in the blow mold until sufficiently set to retain the shape. The reheating, final blowing and cooling of the bottle preferably take place during movement of the molds to a discharging station, where the finishing molds are automatically opened and the bottle is removed and deposited upon a conveyor for transfer to an annealing lehr.

The time required for forming the bottle, i. e. the total bottle forming period, is dependent largely upon the parison forming period and the reheating period, which latter must approximate or, in some instances, exceed the parison forming period, i. e. the total time the glass is in the parison mold. As is well understood, glass chills very rapidly upon being brought into contact with metal, and this action of the parison mold produces a parison characterized by a chilled "skin" or "enamel" encasing the bottle and more plastic glass within. Obviously the longer glass is subjected to this chilling in the parison mold, the more its outer surface is chilled and the longer time will be required for reheating, thus materially lengthening the bottle forming period.

Also the improved machine permits of a very smooth and regular movement of the carrier, approaching the smoothness and speed of continuously rotating machines.

Intermittently rotated glassware forming machines in general use prior to my present invention, which I term herein "prior intermitten machines", are usually actuated by a reciprocating fluid pressure motor arranged to rotate the mold carriers during one of its strokes and during its idle stroke to permit the molds to stand at the various working and idle stations. In order to provide for sufficient time for charging, parison forming, transferring, final blowing and bottle cooling, which take place during resting or stop periods of the mold carrier, the actuator has to be timed so that approximately two thirds of the cycle is occupied by the resting or working period (sufficient for the longest operation upon the glass) leaving only one third or elss of the cycle available for actual turning or movement of the carriers, which makes it necessary to move very rapidly in passing from one operating station to the next, thereby imposing a heavy strain upon the apparatus and resulting in rapid wear and frequent breakdowns.

For example, prior intermittent machines for the production of narrow neck glass containers must provide at least seven stations wherein the molds are brought to rest, i. e., charging, counterblowing, transferring, reheating, final blowing, bottle cooling and take-out, and the resting time at each of these stations must equal the maximum time required for any one of these operations, regardless of whether it is in excess of the time best suited for any other operation. For instance, the duration of final blowing should ordinarily be as long as possible, which may be and usually is in excess of the time required for the compacting and counterblowing of the parison, and hence is the determining factor in limiting the speed at which the machine can be operated to produce satisfactory ware.

In my improved machine all of the forming operation on the glass are performed during mold movement, only the charging, transferring and discharging taking place at stations during resting or stop periods of mold movement, thus permitting independent control of the several forming operations, and requiring only momentary stops or resting periods at the charging, transferring and discharging stations.

This arrangement permits of a complete rearrangement of the operating periods in my improved machine with respect to the movement of the molds, requiring only a fraction of a second for the resting or stop period and allowing the major portion of the cycle for glass fabrication and mold movement. The time in which the glass is subjected to chilling in the blank or parison mold is much shortened in comparison with prior intermittent machines, due to the continuous and uninterrupted steps of compacting and counterblowing the glass, which accordingly may be satisfactorily worked with less time for redistribution of heat throughout the parison, thus permitting earlier final blowing with hotter and better glass and hence resulting in a material increase in the number of bottles per minute produced by the machine.

In the illustrative embodiment of the invention the carriers 10 and 11 for the molds 12 and 13 respectively, are rotatably mounted upon fixed columns 15 and 16 respectively, suitably attached to the base. The carriers may be formed with a depending sleeve or hub 17, suitably supported for rotation around the column, as by a flanged end 18 on the lower end of the hub resting on an antifriction bearing 19, positioned upon a flanged end 20 of the column (see Fig. 5).

The mold carriers (when laterally spaced apart) are interconnected for rotation in unison and, in the present instance, it is desirable that the blank molds and blow molds approach the transfer position in the same direction. This is advantageously accomplished by means of a plurality of intermeshing gears 21, the terminal gears being rigidly connected to the carriers as by bolting them to the flanges 18 on the lower ends of the sleeves 17 (see Fig. 5), the intermediate gears being rotatably mounted in the base. Preferably these gears 21 are spiral gears so as to reduce backlash and insure accurate alinement of the various parts of the machine during resting periods, particularly at the transfer position.

The intermediate gears and their mountings are arranged so that they may be bench assembled and individually placed in the machine as a unit, thus to expedite assembly of the machine and replacement for repairs.

As herein shown the interconnecting gearing for the mold carriers is housed within a well 22 on the base adapted to be closed by a cover 23, so as to protect the gearing from particles of glass and other foreign matter and to permit the gears to run in oil or suitable lubricant so as to properly lubricate them. In order that each gear 21 with its support and bearing may be inserted in the machine as a unit (see Fig. 6), a suitable support 24 is provided adapted to be bolted or otherwise secured in the well 22 of the base, and preferably formed with a depending central sleeve portion 25 provided with a bearing for a stub shaft 26 having the gear hub 27 fixedly secured to the upper end thereof, the gears 21 being bolted to the flanged periphery of the hub 27. The opposite end of the stub shaft 26 projects beyond the end of the sleeve 25 for the reception of a suitable anti-friction thrust bearing 28 suitably clamped in place as by a lock nut 29, and adapted to be enclosed and protected by a cover 30 attached to the lower flanged end of the sleeve 25. The lower face of the support 24 may be machined or otherwise finished so that when bolted to the base, will provide a fluid-tight joint to prevent the leakage of oil from the oil well 22 in the base. Advantageously the upper face of the support may be formed with a bearing surface 31 to cooperate with a corresponding bearing 32 on the gear hub 27, further to support and guide the spiral gears during rotation.

The mold carrier rotating mechanism preferably is fluid operated so as to provide a yielding and flexible power source for the rotation of the mold carriers capable of yielding to stop the machine in the event that any working part of the machine becomes jammed, as frequently occurs, and is further adapted to rotate the mold carrier intermittently in quick succession during each stroke of the fluid pressure motor so as to approach the speed of a continuously rotating machine, the molds pausing in their rotation only long enough to permit charging, transferring and discharge. A fluid pressure operated Geneva gear drive has been found suitable for this purpose and as shown in the drawings, a Geneva star wheel 33 may be fixedly connected to one of the sleeves 17 of the mold carriers, preferably to the blow mold carrier 11, and is formed with a plurality of radial slots 34, there being six of these slots in the form shown, one for each set of molds on the mold carrier, said slots 34 being adapted to receive driving rollers 35 of a driving unit 36 for effecting intermittent rotation of the Geneva star wheel and respective mold carriers. The driving rollers 35 are preferably rotatably mounted upon pins 37 fixed within the upper and lower flanges 38 and 39 of the driving unit 36 rotatably surrounding a vertical shaft 40 mounted in the base parallel to the axis of the blow mold carrier column 16. Preferably the driving unit 36 includes a suitable number of driving rollers 35 directly proportioned in number to the slots 34 of the Geneva gear 33 (three being shown herein, see Fig. 4), properly placed so that at the end of each stroke of the driving motor, two of the rollers are in engagement with two of the slots of the Geneva star wheel, thus effectively locking the mold carriers against accidental movement.

Rotation of the driving unit is effected through a gear 41 (see Figs. 4 and 5), fixedly attached to the lower flange 39 of the driving unit and adapted to mesh alternately with oppositely disposed racks 42 and 43 connected by yokes 44 of a fluid pressure operated actuator comprising a piston rod 45 of a piston 46 working in a fluid pressure cylinder 47. In order to effect successive rotation of the mold carriers in the same direction on each reciprocation of the table actuating piston 46, relative shifting movement between the racks and the pinion 41 is necessary, and in the embodiment shown the provision is made for shifting the pinion 41 first into engagement with the rack 42 and then into engagement with the rack 43. For this purpose the racks 42 and 43 are mounted to slide in different horizontal planes as clearly shown in Fig. 5, but are only slightly spaced vertically so that at all times the pinion is in mesh with either or both of racks 42 and 43 preventing accidental rotation of the molds during stop periods.

The mechanism for shifting the pinion 41 (see Fig. 5) into engagement with the racks 42 and 43 respectively, comprises a piston 48 (see Fig. 5) on the lower end of a sleeve 49 surrounding the vertical shaft 40 and working in an air cylinder 50, the sleeve 49 being connected to a sleeve 51 of the lower flange 39 by means of a split ring or collar 52 and relative rotating movement between the sleeves 49 and 51 being permitted by means of an anti-friction bearing 53.

The weight of the driving unit is counterbalanced by means of a counter balance lever 54 fulcrumed on the machine at 55 and connected at one end to the split collar 52 by means of connecting link 56. The opposite end of the lever 54 has adjustably mounted thereon a counterbalance weight 57 which may be adjusted accurately to balance the weight on the shiftable driving unit.

Means are provided to guide the racks 42 and 43 in their reciprocative movements and to hold them firmly in mesh with the pinion 41 (see Figs. 16 and 17) for this purpose guide rollers 58 and 59 are adjustably mounted upon the base, or other suitable support, preferably in alignment with the axis of the pinion 41, and adapted to bear against the outer faces of the racks 42 and 43 respectively, to hold them firmly in their plane of reciprocation and against the pinion. The guide roller 58 for the rack 42 is rotatably mounted upon an eccentric portion 60 of an adjusting screw 61 (see Fig. 17), so that rotation of the screw effects adjustment of the roller toward and from its rack 42. The guide roller 59 (see Fig. 16), may be supported in a bracket 62 pivoted to the base cover or other part of the machine at 62ᵃ and is adjustable toward and from the rack 43 by means of an adjusting screw 63 mounted in the end of a bracket formed with a tapered end bearing against a threaded post 64 (see Fig. 16)

extending through an oversize hole in bracket 62.

Reciprocative movement of the piston 46 to effect rotation of the mold carriers may advantageously be effected by controlling the admission of fluid under pressure alternately into opposite ends of the cylinder 47 by means of a suitable driving cylinder valve, herein shown as a fluid pressure operated reciprocating valve. As shown (see Fig. 19), the valve comprises a casing or cylinder 65 in which reciprocates a piston valve 66 adapted to establish communication between the constant source of supply M and the outlet ports 67 and 68 alternately which lead to opposite ends of the cylinder 47, as is well understood. The supply of fluid pressure to the respective ends of the valve casing 65 to shift the piston valve 66 is regulated by an indexing valve 69 (see Figs. 5 and 19) operated by a suitable movable part of the machine, for example, the counterweight lever 54 (see Fig. 5), and connected to opposite ends of the valve casing 65 by lines 67ª and 68ª to control shifting of the valve 66 to supply fluid pressure through ports 67 and 68 respectively. This valve may be of suitable design adapted to admit air under pressure from a suitable source, preferably a timing valve (not shown but well understood in the art) to the opposite ends of the valve casing 65 through lines 67ª and 68ª, and in the present embodiment it is preferable that the valve 69 control the air at the proper time after the table rotative movement has been completed and relative shifting effected between the racks 42 and 43 and the pinion 41. Accordingly I find it advantageous to operate the valve 69 from the shiftable driving unit 36, preferably from the counterbalance lever 54 controlled by the position of the piston 48 in the cylinder 50 to which air is supplied from a suitable constant source M through a main air valve 70 controlled by the table rotating mechanism, for example, a reciprocating valve arranged to be actuated at the ends of the opposite strokes of the fluid pressure operated actuator, as is clearly shown in Fig. 19.

Thus a simple and efficient automatic control is provided for the carrier turning mechanism through a main air valve 70 arranged to be operated on opposite strokes of the actuator 46 and which in turn controls the admission of air into the opposite end of the cylinder 50 to shift the piston 48 and the pinion 41 carried thereby into mesh with the opposite rack, thus positioning the gearing in readiness for the next succeeding turning stroke. In shifting the piston 48 the indexing valve 69 is likewise reversed through the counterbalance lever 54, so that the next supply of air under pressure at the proper time as determined by the timing valve (not shown) will reverse the position of the driving cylinder valve 64 and admit air into the opposite end of the cylinder 47. The several valves and their connecting parts exhaust back through these supply lines, as is well understood in the art, so that proper timing of the operation of any of the fluid operated parts may be adjusted and controlled through suitable choke or cushion valves as is well understood.

The base of the machine is constructed and arranged to house the several parts of the carrier turning mechanism and to protect them from bits of glass and other particles as would tend to clog or jam the mechanism.

The base is of substantially rectangular outline provided at its ends with ground rollers 71 mounted on axles 72 adapted to roll on tracks 73 so as to be readily moved into and out of operative position with reference to the glass tank.

As stated above, the base is provided with a well 22 constituting an oil reservoir for the interconnecting gearing between the mold carriers so that they may run in oil, and this reservoir 22 and the gears 21 are covered by a series of cover plates 23 as shown in Fig. 2. Advantageously, the end cover plates 23 extend from the end of the reservoir to the axes of the mold carrier columns 15 and 16, and the intermediate cover plates extend from the axes of the mold carrier columns where they join and tightly fit the edges of the end cover plates to about midway the length of the oil reservoir. The base further is provided with an arcuate shaped recess 76 extending parallel with the oil reservoir and in which is mounted the cylinder 47 of the table turning mechanism. In alinement with the arcuate section 76 and the blow mold carrier column 16, the base is suitably recessed and flanged (see Fig. 5) to receive the driving unit 36 which may be secured to the base by suitable means as bolts 77, permitting the entire driving unit 36 to be bench assembled and inserted in and removed from the machine as a unit. A cover plate 78 (see Figs. 2, 3, 4, 5 and 6) is provided for covering and guarding the mechanism of the driving unit against flying particles of glass and other matter, and this cover plate is suitably secured to the base as by bolting in a suitable manner and has a horizontally extending cover portion extending over the driving unit and providing top support 79 for the shaft 40.

The particular mechanism for effecting high speed intermittent rotation of the mold carrier or carriers, above described, is not restricted in any sense to the particular type of ware to be made upon the machine or to the manner of forming the parison and it is adaptable to various machines, such as press machines, press and blow machines, suction machines and gob fed machines, and others wherein the molds are mounted for rotary movement.

One feature of my invention, however, relates to the novel control for the supply of molten glass to the parison mold by means of the well known suction or vacuum process. As illustrated herein instead of the usual method of dipping the molds into the stationary supply of molten glass which involves cumbersome and heavy operating mechanisms in the machine, I provide mechanism for intermittently raising the level of a body of molten glass into a plane above the bottom of the parison mold so that when suction is applied to the neck ring of the parison mold in the usual manner, the glass will be drawn into it and the mold filled. Advantageously such mechanism may comprise a pot 80 having a refractory lining adapted to receive the supply of molten glass flowing from a melting furnace as is well understood, and preferably this pot 80 is mounted for rotation upon a shaft 81 so that fresh positions or portions of the glass may be presented to successive molds. One form of apparatus suitable for this purpose is shown in the patent to Graves and Whittemore No. 914,823, granted March 9, 1909.

Advantageously the pot 80 is rotated by suitable gearing 82 which may be driven by a motor driven reducing gearing or connected to the mold carriers by suitable driving means (not shown). In order to effect intermittent raising and lowering of the pot 80, the weight of the pot may be counterbalanced by means of a counterbalance weight 83 adjustable upon a lever 84 connected to the shaft 81 so that the pot may be readily raised and lowered into and out of contact with the molds by means of a relatively slight pressure which may be applied to the shaft by suitable means, as for instance, a piston 85 attached to the lower end of the shaft and working in an air cylinder 86. As will be understood, when air is admitted to the lower end of the cylinder 86, the piston 85 and shaft 81 will be raised to present the glass in the pot into engagement with the bottom of the parison mold so that the suction applied to the neck end of the parison mold may lift the glass therein and fill the mold. Reversely air admitted to the upper end of the cylinder 86 will lower the shaft and pot away from the mold to permit rotation of the mold away from the gathering position. Provision is made for continuous rotation of the shaft during vertical reciprocation thereof by suitable means as by splining the driven gear 82 upon the shaft 81.

Following the gathering of the glass from the pot 80 into the parison mold 10 the gathered charge may be sheared from the supply in the pot by any suitable means (not shown), and the glass in the parison mold may thereafter be fabricated into a preshaped parison during movement from the gathering station.

The parison molds and accessories for shaping the parison therein may be of any suitable construction, suitable for the purpose, but the construction and arrangement shown herein is advantageous, being simple of construction and operation.

The parison molds 12 are preferably of the well known sectional type advantageously formed with suction passages 12$^a$ communicating with the inside of the mold to assist in filling the mold with glass, when suction is applied thereto, as is well understood, being supported in holders 87 hingedly mounted to a hinge pin 88 upon the mold carrier 10 and adapted to be moved to opened and closed position by means of a slide 89 having operative connections with a controlling cam 90 fixed to the column 15. The neck rings 14 of the parison mold unit are likewise formed in separable sections being hingedly mounted upon the hinge pin 88 and normally held closed by spring means (not shown) as is customary in the art. Above the neck ring 14 and in axial alinement therewith is a holder 91, (see Figs. 1 and 18) having a central opening to receive a mouth forming pin 92 on a stem 93 slidably mounted in a bearing 94 and surrounded by a spring 95 tending normally to move the mouth forming pin into retracted position away from the neck ring. The stem 93 of the mouth forming pin carries a roller 96 adapted to be engaged by a cam 97 (see Fig. 1) at the charging or gathering position to move the pin 92 into position to close the mouth opening in the neck mold.

Suction may be applied to the neck end of the mold at the charging or gathering position by means of a suitable valve controlled by a fluid pressure operated piston 98 adapted when moved into engagement with the holder 91 to establish communication between a source of suction (not shown) and a port 99 in the holder and leading to the neck end and passage 12$^a$ of the parison mold for filling the mold with glass, as is well understood.

Following the charging of the mold, movement of the mold carries the roller 96 away from cam 97, permitting spring 95 to withdraw the mouth forming pin from the neck mold. Fluid under pressure may then be admitted to the neck end of the mold through cored passage 100 extending through the holder and mold support and controlled by a suitable rocker valve 101 under the mold carrier 10. This counter-blowing of the parison is preferably done while the parison is confined in the parison mold by a suitable closure, as is well understood in the art, which may be in the form of a pivoted closure similar to the blow mold bottom plates hereinafter described, or by means of the shear blade, as shown in the Bock Patent No. 852,097, for example. It is to be noted that this counterblowing air, although admitted through the neck ring is separate from the suction passages leading to the neck ring and parison mold, so that the application of counterblowing pressure air is confined in the neck end of the parison.

Successive movements of the parison mold carrier bring the charged mold toward the transfer position, and upon approaching this position, the parison molds 12 are slowly opened leaving the parison hanging in the closed neck mold 14. The open blow molds 13 are moved synchronously with the parison molds toward the transfer position, and as they approach said position, they are slowly closed around the approaching exposed parison, so that when the carriers come to rest, the blow molds are partially closed around the parison, which, however, is still supported by the neck mold (see Fig. 1).

The finishing or blow molds 13 are preferably of the sectional type, being supported in holders 102 hingedly mounted upon a hinge pin 103 and adapted to be moved to opened and closed positions by means of a slide 104 having a roller 105 in engagement with a cam 106 on the column 16, as in the case of the parison molds. The mold bottom 107 is adapted to close the lower end of the mold, as is well understood.

In order to effect transfer of the parison from the parison mold carrier 10 to the finishing mold carrier 11 suitable means is provided for releasing the neck ring from the parison and to effect final closing of the blow mold around the parison. Preferably the neck rings are opened slightly in advance of the complete closing of the blow mold so that the neck portion of the parison will not be checked or marked. As herein disclosed, the fluid pressure operated pistons 108 and 109 (see Fig. 19) are mounted respectively above the parison molds and finishing molds, the piston 108 being adapted to engage a pivoted lever 110 having a part 111 adapted to engage the neck ring. The piston 109 is adapted to engage a part of the finishing molds as the blow mold is moved into transferring station, as disclosed in my copending application with James W. Lynch, Serial No. 172,678, filed June 4, 1917. The admission of air pressure to the proper ends of these pistons effects movement thereof, to close the finishing mold around the parison and at the same time effect release of the neck rings from the parison whereby the parison may be supported entirely by the finishing mold, and advantageously the operation of the releasing of the neck rings is adjusted by valves in the air lines as indicated in Fig. 19 so that it may take place just prior to the completion of the closing of the blow molds.

The continued movement of the blow mold carrier moves the blow mold toward a discharge station, during which movement the bottle is blown into its final form by means of a blow head 94 as is well understood. The mechanism for controlling the starting, duration, as well as the volume and pressure of the final blowing may be of any suitable type, preferably such as disclosed in my copending application Serial No. 386,894, filed August 19, 1929.

Mechanism is provided for automatically removing the blown bottles from the machine following the opening of the finishing molds as they approach the discharge of take-out station by means of the mold controlling cam. As herein shown, the take-out mechanism comprises a rotatable member carrying article gripping devices adapted to grip and lift the ware from the bottom plate of the mold, and upon rotation, to remove it therefrom and deposit it upon a suitable support, as for instance, a conveyor 112 leading to an annealing lehr (not shown). Specifically, the take-out mechanism may embody a vertical shaft 113 journaled at its lower end for rotation in the bearing 114 on the outer end of a bracket arm 115 securely bolted to the base of the machine (see Figs. 7 and 8) and journaled in its upper end for rotation in a bracket arm 116 carried by the upper end of the column 16 of the blow mold carrier. The other end of the bracket arm 115 is recessed at 117 to provide an oil reservoir for suitable gearing 118 connecting the shaft 113 to a horizontal shaft 119 journaled in a bearing 120 and in the bracket 115 and adapted to be rotated with the rotation of the table as by means of a beveled gear 121 in mesh with a ring gear 122 on the blow mold carrier. Advantageously a circular guard plate 123 may be secured to the base cover 23 surrounding the gears 121—122 so as to protect them from flying particles of glass and other foreign matter.

A plurality of ware gripping devices 124 are suitably mounted upon the outer ends of arms 125 of a bracket 126 keyed as at 127 for rotation with the shaft 113 and adjustable thereon by means of clamping nut 128 threaded upon the shaft so that the position of the bracket 126 and the gripping devices 124 may be adjusted vertically to effect the gripping and removal of ware of varing heights. The outer ends of the arms 125 of the bracket 126 are preferably in the form of hollow sleeves 129 within which are rotatably mounted cylinders 130 having pistons 131 and hollow piston rods 132 slidable through suitable stuffing boxes 133 in the end of the cylinders. The lower end of the cylinders 130 carry depending brackets 134 having elongated slots 135 therein in which is slidably mounted cross pin 136 extending through an elongated slot 137 in the hollow piston rod 132. Within the hollow piston rod is a spring pressed plunger 138 bearing against the cross pin 136 to hold it in the lower end of the elongated slot 135 of the brackets 134. A pair of gripping members 139 are pivoted as at 140 intermediate their ends to the cross pin 136 and their outer ends are loosely connected as at 141 to lateral extensions 142 of the piston rod 132. When the piston 131 is in the lower position in its cylinder 130, as shown in Figs. 11 and 12, the spring pressed plunger 138 holds the cross pin 136 and the fulcrumed portions of the gripping members 139 in the lower end of the slots 135 and the brackets 134, thus holding the gripping members in elevated position as shown in full lines, Fig. 11, so that the gripping devices may be moved into position over the ware. When it is desired to grip the ware, air is admitted to the lower end of the cylinder to lift the piston 131 therein and during the first portion of this movement, the extensions 142 of the piston rod 132 are raised to the dotted line position shown in Fig. 11, while the cross pin 136 remains in a substantially fixed position in the bottom of the slot 135 due to the pressure exerted upon it by the spring pressed plunger 138. This effects downward swinging movement of the gripping members 139 so as to grip the blown ware in the machine preparatory to the removal of it therefrom, and preferably the arrangement is such that the gripping members grip the ware immediately under the crown or bead of the finish of the bottle. The length of stroke of the piston 131 in its cylinder 130 is somewhat longer than the length of the slot 137 in the hollow piston rod 132 so that as the piston 131 approaches the upper portion of its stroke, the lower end of the slot 137 of the piston rod will engage the cross pin 136 and effect lifting of the gripping members and the ware from the bottom plate of the mold upon which it has been standing. Upon the next succeeding rotation of the blow mold carrier, the ware will be moved from its position in the machine to a position over the conveyor 112 and during the succeeding stop period of the mold carrier, the air pressure in the cylinders 130 may be reversed to effect the depositing of the ware on the conveyor as is well understood.

In removing certain types of ware, for example, panels and certain classes of flat prescription ware, it is desirable to deposit it upon the conveyor so that its longest side is in substantial alinement with the direction of movement of the conveyor to avoid tipping or falling of the ware from the conveyor during movement thereof. For this purpose, it is necessary to rotate the gripping member during removal of the ware from the machine so as to properly position it on the conveyor, and this may be accomplished advantageously by the mechanism shown in the drawings, comprising a two-armed bracket member 144 carried by a part of the stationary bracket 116. One arm 145 of the bracket member is provided with an elongated slot 146 in which is mounted for vertical adjustment the threaded stop member 147 adapted to be positioned in the path of the ware gripping members during their movement of rotation from the machine to the point of deposit upon the conveyor. The other arm 148 of the bracket member 144 carries a similar stop member 149 adapted to be positioned in the path of movement of the gripping member from its position over the conveyor back to the machine. The upper surface of the cylinder 130 is provided with a pair of abutments or ribs 150 and 151, the rib 150 being normally disposed radially of the blow mold carrier when in position to grip the ware and in axial alinement with the elongated bottle indicated in dotted lines Fig. 9. During rotation of the ware gripping members from the machine to the point of depositing the ware upon the conveyor, the arm 150 comes in contact with the stop member 147 and effects rotation of the cylinder 130 in its sleeve 129, thus rotating the ware gripping members and the ware carried thereby axially to position the elongated bottle lengthwise of the conveyor as shown. Upon the return movement of the gripping member during the next succeeding rotation from its position over the conveyor back to its position over the blow mold of the machine, the rib member 151 comes in contact with stop member 149 on the arm 148 to effect return oscillation or rotation of the cylinder 130 in its supporting sleeve 129.

It is apparent that the admission of air to the respective cylinders 130 of the take-out device may be such that when air is admitted to the lower end of the cylinder over the blow mold to effect gripping and lifting of the ware, air in the opposite cylinder may be admitted to the upper end thereof to effect lowering of the piston and depositing of the ware on the conveyor. These two operations take place simultaneously during the brief stop interval of the mold carrier. Accordingly the sleeves 129 are formed with oppositely disposed ports 152 and 153 connected respectively to the upper and lower ends by means of slots 152a and 153a, grooves 154a and 155a leading to cored passages 154 and 155 at opposite ends of the cylinder 130. The admission of air to these cylinders may be supplied by two pipe lines 156 and 157, each connected to branch lines 156a and 157a leading to ports 152 and 153 connected to the opposite ends of the respective cylinders 130. The supply of air to the lines 156 and 157 may be controlled by any convenient part of the machine, for example, the main air control valve 70 which is arranged to be actuated at the ends of the opposite strokes of the carrier rotating piston or actuator 45.

In order that the pipe lines may be housed free from damage by moving parts of the machine they preferably are carried through the hollow bracket 116 and connected to ports of the outer end of the bracket 116 communicating with a rotatable valve on the shaft 113 journaled in the bracket. The port communicating with the line 156 is in communication with the circumferential groove 158 near the upper end of the shaft 113 and this groove is in communication with a vertical passage 159 leading to the branch air line 156a, the upper end of the passage 159 being plugged as at 159a. The port communicating with the line 157 is in communication with the port 160 in the bearing 116 communicating around the end of the shaft with a vertical passage 161 in the shaft and leading to the branch lines 157a. It will be understood that when air pressure is on the line 156, line 157 is on exhaust. From reference to Figs. 7, 10 and 19 it will be apparent that when air pressure is applied through branch line 156a to the lower end of the cylinder 130 in position to grip the ware, that air pressure is likewise applied through branch line 156a to the upper end of the cylinder over the conveyor to deposit the ware. Likewise at this time the branch lines 157 and 157a leading to the lower end of the cylinder over the conveyor and the upper end of the cylinder to grip the ware in the machine are on exhaust so that these simultaneous reverse operations of the two gripping members may be controlled from a single valve of the machine.

Many of the fluid pressure controlled parts of the machine, such as the carrier actuating piston 46, pinion shifting piston 48 and the pistons 131 in the take-out cylinders 130 make but a single movement during each cycle or stop period of the mold carriers, and hence the operation of these parts may be adequately controlled by the main air valve 70. Other parts of the machine, for example, the blow mold closing piston 109, the neck mold opening piston 108, the glass pot lifting piston 85 and suction valve control piston 98 must make an actuating stroke and a return stroke during each cycle or stop period of the machine, and hence must be controlled by a resetting valve permitting such movements. One form of resetting valve suitable for this purpose is illustrated in Figs. 14, 15 and 19 and may be of the rotary type comprising a valve casing 162 having a rotatably mounted valve stem 163 therein and carrying a series of rollers 164. The resetting valve is suitably supported in convenient position on the machine as by means of a bracket 165 adapted to be attached to the base in position to be actuated by one of a series of webs 166 of mold carrier 10. The valve casing is provided with a plurality of inlets 167 and 168 adapted to be connected through pipe lines 169 and 170 with respective discharge ports of the main air valve 70. The valve casing 162 is provided with a pair of oppositely disposed outlet ports 171 and 172, the port 171 supplying air to the line 173 leading to the forward end of the neck ring releasing cylinder to effect resetting of the piston 108 to the forward end of the blow mold closing cylinder to effect resetting of the piston 109, to the upper end of the glass pot shifting cylinder to effect shifting of its piston or glass pot out of parison mold gathering position and to the forward end of the suction control valve to cut off suction.

The discharge port 172 of the valve casing 162 supplies air to the line 174 leading to the opposite ends of the respective blow mold closing cylinder, neck ring releasing cylinder, glass tank shifting cylinder, and suction control valve to effect closing of the blow mold, release of the neck rings and raising of the glass pot and applying suction to the parison molds.

The valve stem 163 of the resetting valve is formed with upper and lower transversely formed passages 175 and 176 respectively disposed at right angles to each other, the passage 175 being adapted to connect the inlet port 167 with the upper end of a vertical passage 177 in the opposite wall of the casing and in communication with outlet 172, and the lower passage 176 being adapted to connect the inlet passage 168 with the lower end of the passage 177 leading to the outlet 172. The valve stem 163 is further provided with a pair of oppositely disposed grooves 178 adapted to connect the inlet port 167 with the outlet port 171 and another pair of grooves 179 adapted to connect the lower inlet port 168 with the outlet 171. From the above it will be seen that as the table actuator piston 46 reaches the end of its stroke and the mold carriers are brought to rest, the valve 70 is shifted to the position shown in Fig. 19 admitting air to line 170 to shift the pinion 41 into engagement with the rack 43, to admit air to line 156 to effect gripping of the ware at the discharge station of the machine and depositing of the ware on the conveyor and to supply air under pressure to the port 168 of the resetting valve 162.

Assuming the resetting valve 162 to be in the position shown in Fig. 19, with its port 176 connecting the ports 168 and 172, air admitted to line 170 by valve 70 (see Fig. 19) will flow through port 168, passages 176 and 177, and port 172 to line 174 to control the actuation of the blow mold closing piston 109, neck mold opening piston 108, suction valve piston 98 and glass pot lifting piston 85. As these several mechanisms must be in their inoperative or reversed position when the mold carriers are again brought to a stop, it is necessary that the resetting valve 162 control the reversal of air to the respective cylinders before the next shifting of the valve 70. However, as before explained, the shifting of the valve 70 to supply air into the line 170, also effects shifting of the drive pinion piston 48, and valve 69 to reverse piston valve 66 when the supply of air is admitted from the timing valve and move carrier actuating piston 46 on its next stroke. The turning of the mold carrier causes one of the fingers 166 thereon to come in contact with one of the rollers 164 on valve stem 163, causing the valve stem to be rotated one quarter of a revolution, thus placing the valve in the position shown in Fig. 15. This quarter rotation of the valve cuts off the flow of air to port 172 and line 174, establishing the flow of air to line 173 through port 171, groove 179 and port 168 and places line 174 on exhaust through passage 175 connecting port 172 with port 167. The valve stem 163 will be in this position during the next succeeding actuation of the valve 70 which will direct the admission of air pressure through line 169 and placing line 170 on exhaust. In this position air from line 169 will flow through port 167, passages 175, 177, and outlet port 172 to line 174 to effect actuation of the several fluid pressure operated devices that require complete cycles of operation upon a single turning movement of the carrier. Line 173 will exhaust through port 171, groove 179 and port 168 connected to line 170 which is now on exhaust.

The timing of and speed of operation of the various fluid pressure operated mechanisms may be conveniently adjusted and variably controlled by suitable valves in the air lines as indicated in Fig. 19.

Advantages of my invention reside in its simplicity of construction, economy and speed of operation and facility with which the parts thereof may be replaced for repair or for production of ware of different size or character.

The mechanism for rotating the mold carriers is simple in construction and control and positive in operation and permits of maintaining the same time intervals for the several fabricating operations as in existing intermittent machines of the well known Lynch "No Boy" type (as shown in my copending application filed jointly with James W. Lynch, Serial No. 172,678, filed June 4, 1917) with a material increase in production over that capable of such existing intermittent machines. The several mechanisms of the machine which are subject to the heaviest wear, such as the driving unit 36, the interconnecting gears 21, and others, may be bench-assembled and readily replaceable in the machine as units, thus materially reducing the time that the machine must be shut down when repairs are necessary. Also these gears run in oil and are protected from dirt. The simple automatic control of the machine, involving a minimum of valves, makes for positiveness in operation, and the arrangement of the glass gathering pot, together with the simplicity of control therefor, materially simplifies the problem of gathering the glass and the construction of the parison mold carrier.

As previously stated the individual control for each fabricating operation permits adjusting the conditions to suit the exact requirements of each article or bottle to be made, and also permits the continued and regular progression of the several stops necessary in the working of the glass, uninterrupted by periods tending to chill the glass or render it unsuitable for most satisfactory working, and permitting the production of more bottles per minute on the machine. Furthermore the rotation of the mold carriers in my improved machine is more even and gradual than in prior intermittent machines wherein each step of rotation must be accomplished very rapidly, causing rapid wear and frequent breakage of the machine.

The novel rotating mechanism of my improved machine, including the Geneva gear and its drive, permits the load to be taken up gradually as the roller enters a slot in the Geneva gear, progressively increasing in speed as the roller moves inwardly in the slot, and gradually braking the rotation of the carriers as the roller recedes in the slot, thus producing a more gradual and even rotation of the carriers, which avoids "checking" of the ware in the molds due to the violent whipping of the rotating mechanism of prior intermittent machines.

Further advantages reside in the simplicity of construction, particularly in the carrier rotating mechanism, in that the shifting of only a single element (the pinion 41) is required between cycles, whereas in prior fluid pressure operated machines the power device must be disconnected and reconnected with the carrier, and the carrier locked and unlocked between each movement. In my improved machine, the actuating piston and rack is connected to the carrier at all times, and acting through the two rollers 35 engaged in slots in the Geneva gear wheel, the rack serves to lock the carriers against rotation during stop periods of the actuator. Also, the elimination of the idle stroke of the actuator, necessary in prior intermittent machines, materially reduces the consumption of compressed air.

Obviously my invention is not restricted to the details of construction shown and described, which are intended for illustrative purposes only, but embraces the equivalents thereof known in the art within the scope of the appended claims.

I claim:

1. A take-out mechanism for glassware forming machines having a rotatable mold support and means for automatically opening said mold, comprising a multiple-armed take-out device rotatably mounted, a fluid pressure operated ware gripping member rotatably mounted on each arm of said device, means for rotating said device to present one of the gripping members in position over a mold and another in position to deposit the ware on a suitable support means for effecting partial rotation of each gripping member in its supporting arm and valve means for simultaneously applying fluid pressure to the opposite ends of respective fluid pressure operated grippers whereby to cause the gripping means to grip and lift the ware from the machine, and to deposit the ware by the grippers over the support.

2. Mechanism for removing ware from glassware forming machines comprising oppositely disposed gripping members, an axially rotatable fluid pressure operated means individual to each gripping member for effecting actuation thereof, a single control means for effecting pneumatic operation of opposed grippers in opposite directions, means for moving said grippers to effect removal of the ware and means for rotating the fluid pressure operated means axially.

3. In a glassware forming machine, in combination with a sectional shaping mold, and means for opening the mold, of ware removing means comprising a rotatable support, opposed gripping members rotatably mounted on said support, means for rotating said ware removing means to effect removal of the ware from the mold and depositing it at a point remote therefrom, means for effecting partial rotation of the gripping members relatively to the support, a fluid pressure operated actuator individual to each of said gripping members, and means for simultaneously admitting fluid pressure to opposite ends of said actuators to actuate them in reverse direction.

4. In a glassware forming machine, mechanism for removing ware from molds comprising a multiple armed support rotatably mounted, a fluid pressure operated gripping member for each arm of said support and having its cylinder rotatably mounted therein, means for rotating said support, and means lying in the path of said gripping members and adapted upon engagement thereby to effect partial rotation of said gripping members with reference to said support.

5. In a glassware forming machine, mechanism for removing ware from the molds comprising a multiple armed support rotatably mounted, a pneumatically operated gripping member for each arm of the support and including a cylinder journalled for rotation therein, and means for axially turning the gripping member and ware through substantially ninety degrees driving rotation of said support.

6. In a take-out mechanism for glassware forming machines, a movable support having a portion constituting a bearing, a fluid pressure operated gripper carried by said support with the cylinder thereof rotatably mounted in the bearing portion of said support, air passages connected to opposite sides of said bearing portion, and connected respectively to the opposite ends of said cylinder, means for effecting partial rotation of the cylinder axially in said bearing portion, without interrupting the connections between said ports and its respective ends of the cylinder.

7. In a glassware forming machine, a series of parison molds movably mounted, a series of upright blow molds movably mounted, reciprocable means for intermittently moving said molds in a constant horizontal plane and momentarily halting said parison molds at a charging position for a brief period of time of less duration than the succeeding turning period, a receptacle containing a supply of molten glass, means rendered operative at the conclusion of a stroke of said reciprocable means and operable only during stop periods of said molds for periodically raising the supply of molten glass for establishing charging contact between the glass in said receptacle and the successive parison molds in a certain predetermined order, applying suction to the upper end of the parison mold as charging contact is made to raise a charge of glass therein and then breaking charging contact, devices cooperating with said parison mold for shaping the charge therein during mold movement, automatic means for transferring the parison from the parison mold to the blow mold and means for blowing the article to finished form in the blow molds.

8. In a glassware forming machine, a circular series of parison molds, reciprocable means for intermittently moving said molds in a uniform constant horizontal plane and momentarily halting said parison molds at a charging position for a brief period of time of less duration than the succeeding turning period, a neck mold associated with each parison mold, a mouth forming pin associated with each neck mold and adapted to close the mouth end thereof when the glass is charged therein, a receptacle containing a supply of molten glass, means controlled by said reciprocable means and rendered operative during stop periods of the machine for establishing charging contact between the glass in said receptacle and each parison mold in succession, applying suction to the upper end of the parison mold at the moment of charging contact to raise a charge of glass therein and for breaking said charging contact, devices cooperating with said parison mold for shaping the charge therein during mold movement, automatic means for transferring the parison from the parison mold to the blow mold during stop periods thereof, and means for blowing the article to finished form in the blow molds.

9. In a glassware forming machine, a circular series of parison molds, reciprocable means for moving said molds intermittently in quick successive momentary stop periods between moving periods of greater duration and in cycles of definite duration corresponding to the productive speed of the machine and in a uniform constant horizontal plane, a neck mold associated with each parison mold, a mouth forming pin associated with each neck mold and adapted to close the mouth end thereof when the glass is charged therein, a receptacle containing a supply of molten glass, means controlled by said reciprocable means and set in operation during stop periods of mold movement for establishing charging contact between the glass in said receptacle and each parison mold in succession, means for applying suction to the neck end of the parison mold at the instant charging contact is established to draw a charge of glass therein, devices cooperating with said parison mold for shaping the charge therein during mold movement, automatic means for transferring the parison from the parison mold to the blow mold and means for blowing the article to finished form in the blow molds.

10. In a glassware forming machine comprising a circular series of parison molds and a series of cooperating blow molds, means for rotating said molds intermittently in quick successive momentary stop periods between moving periods of greater duration and comprising a reciprocable actuator, a neck mold associated with each parison mold, a mouth forming pin adapted to close the mouth end of said neck mold when the glass charges are placed therein, a receptacle containing a supply of molten glass, means controlled by said actuator at the end of its stroke for establishing an operative charging contact between the glass in said receptacle and successive parison molds at the end of each mold turning movement of said actuator, means for applying suction to the upper end of the parison mold at the instant charging control is established to raise a charge of glass therein, devices cooperating with said parison mold for shaping the charge therein during mold movement, automatic means for transferring the parison from the parison mold to the blow mold and means for blowing the article to finished form in the blow molds.

11. In a glassware forming machine comprising a circular series of parison molds and a series of cooperating blow molds, means for rotating said molds intermittently, comprising a reciprocable actuator, a main air valve arranged to be shifted on opposite strokes of said actuator, and a neck mold associated with each parison mold, a mouth forming pin adapted to close the mouth end of said neck mold when the glass charges are placed therein, a receptacle containing a supply of molten glass, means for establishing an operative charging contact between the glass in said receptacle and successive parison molds, connections controlled by said main air valve for effecting said operative charging contact, means for applying suction to the neck end of the parison mold at the instant of establishing the cooperating charging contact to draw a charge of glass therein, devices cooperating with said parison mold for shaping the charge therein during mold movement, automatic means for transferring the parison from the parison mold to the blow mold and means for blowing the article to finished form in the blow molds.

12. In a glassware forming machine comprising a circular series of parison molds and a laterally spaced series of cooperating blow molds, means for rotating said molds intermittently comprising a reciprocable actuator, a neck mold associated with each parison mold, a mouth forming pin adapted to close the mouth end of said neck mold when the glass charges are placed therein, a receptacle containing a supply of molten glass, means for establishing an operative charging contact between the glass in said receptacle and successive parison molds at the end of each mold turning movement of said actuator, means for applying suction to the neck end of the parison mold at the instant of establishing the cooperating charging contact to draw a charge of glass therein, devices cooperating with said parison mold for shaping the charge therein during mold movement, automatic means for transferring the parison from the parison mold to the blow mold and means for blowing the article to finished form in the blow molds.

13. In a glassware forming machine, a series of parison molds and a series of blow molds, a reciprocative fluid pressure operated actuator for intermittently moving said molds during each movement of the actuator, a valve arranged to be actuated at the end of each stroke of said actuator, a receptacle containing a supply of molten glass, means operating during a stop period of the machine for effecting relative movement between said receptacle and parison molds to establish an operative gathering contact therebetween, means for applying suction to the neck ends of said parison molds simultaneously with the establishing of contact between the mold and glass to effect raising of the glass therein and charging thereof, devices cooperating with said parison molds during movement thereof to shape the glass charges therein and form a parison, mechanism for automatically transferring the parison from the parison mold to the blow mold, devices cooperating with the blow molds for blowing the article therein to final form, means for automatically opening the blow molds to expose the finished blow article, and connections controlled by said valve for automatically controlling the charging of the parison molds and the transfer of the parison during resting periods of the machine.

14. In a glassware forming machine, a series of parison molds having open bottoms, neck molds permanently mounted above said parison molds for association therewith, a series of upright finishing molds, movable carrying means on which said parison and neck molds are fixedly mounted so that they may be moved in a constant horizontal plane to and from a stationary gathering position, reciprocable fluid pressure operated means for intermittently moving said carrying means to present successive parison molds at said gathering position in quick succession and momentarily halting them at such position for a brief period of time of less duration than succeeding moving periods, a receptacle containing a supply of molten glass located at said gathering position and normally positioned below the plane of the bottoms of said molds, fluid pressure operated means controlled by said reciprocable means at the conclusion of a stroke thereof and operative for raising the receptacle after a parison mold moves to a position above it to establish charge-gathering contact between said supply of glass and the mold while the mold is stationary, fluid pressure operated means mounted at the gathering position and controlled by the means for moving the mold carrying means to apply suction in the parison mold to gather a charge of glass therein, means for breaking the charge gathering contact between the mold and the supply of glass and moving the charged mold away from the gathering position, means operative during such movement of the charged mold for shaping the charge of glass therein to form a parison, means for transferring the parison from the parison mold to a finishing mold, and means for blowing the parison to final form in the finishing mold.

15. In a glassware forming machine, a series of parison molds having open bottoms, neck molds permanently mounted above said parison molds for association therewith, a series of upright finishing molds, movable carrying means on which said parison and neck molds are fixedly mounted so that they may be moved in a constant horizontal plane to and from a stationary gathering position, reciprocable fluid pressure operated means for intermittently moving said carrying means to present successive parison molds at said gathering position in quick succession and momentarily halting them at such position for a brief period of time of less duration than the succeeding moving periods, a receptacle containing a supply of molten glass located at said gathering position and normally positioned below the plane of the bottoms of said molds, fluid pressure operated means operative for raising the receptacle after a parison mold moves to position above it to establish charge-gathering contact between said supply of glass and the mold while said mold is stationary, means to apply suction to the parison to gather a charge of glass therein, valve means for controlling and reversing the supply of fluid pressure to said reciprocable fluid pressure operated means, means operative during charge gathering for resetting said valve means to a position to move the charged parison mold away from the gathering position, means controlled by the movement of the charged parison mold for lowering the receptacle and for shaping the glass charge in the parison mold during movement thereof, means for transferring the parison from the parison mold to a finishing mold, and means for blowing the parison to final form in the finishing mold.

16. In a glassware forming machine, a series or parison molds having open bottoms, neck molds permanently mounted above said parison molds for association therewith, a series of upright finishing molds, movable carrying means on which said parison and neck molds are fixedly mounted so that they may be moved in a constant horizontal plane to and from a stationary gathering position, reciprocable fluid pressure operated means for intermittently moving said carrying means to present successive parison molds at said gathering position in quick succession and momentarily halting them at such position for a brief period of time of less duration than the succeeding moving periods, a receptacle containing a supply of molten glass located at said gathering position and normally positioned below the plane of the bottoms of said molds, fluid pressure operated means operative for raising the receptacle after a parison mold moves to a position above it to establish charge-gathering contact between said supply of glass and the mold while said mold is stationary, means to apply suction in the parison mold to gather a charge of glass therein, valve means for controlling and reversing the supply of fluid pressure to said fluid pressure operated means, means operative during charge gathering for resetting said valve to position to move the charged parison mold away from the gathering position, a resetting valve operated by movement of the mold away from the gathering position for reversing the flow of fluid pressure to the receptacle lifting means to lower said receptacle, means for transferring the parison from the parison mold to a finishing mold, and means for blowing the parison to final form in the finishing mold.

EDWARD G. BRIDGES.